US007716364B2

(12) United States Patent
Kishore et al.

(10) Patent No.: US 7,716,364 B2
(45) Date of Patent: May 11, 2010

(54) INTERNET PROTOCOL MULTICAST REPLICATION

(75) Inventors: Karagada Ramarao Kishore, Saratoga, CA (US); Chien-Hsien Wu, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 1218 days.

(21) Appl. No.: 10/819,980

(22) Filed: Apr. 8, 2004

(65) Prior Publication Data

US 2005/0021825 A1    Jan. 27, 2005

Related U.S. Application Data

(60) Provisional application No. 60/483,027, filed on Jun. 27, 2003, provisional application No. 60/529,620, filed on Dec. 16, 2003.

(51) Int. Cl.
*G06F 15/173* (2006.01)

(52) U.S. Cl. .................... 709/238; 709/240; 709/232; 370/390

(58) Field of Classification Search ......... 709/238–240, 709/223, 232; 370/390, 229
See application file for complete search history.

(56) References Cited

U.S. PATENT DOCUMENTS

| 6,831,891 | B2 * | 12/2004 | Mansharamani et al. .... 370/229 |
| 6,870,844 | B2 * | 3/2005 | Tuck et al. .................... 370/390 |
| 7,007,071 | B1 * | 2/2006 | Brown ......................... 709/213 |
| 7,124,166 | B2 * | 10/2006 | Brown ......................... 709/238 |
| 2002/0126671 | A1 * | 9/2002 | Ellis et al. .................... 370/390 |
| 2004/0008716 | A1 * | 1/2004 | Stiliadis ....................... 370/429 |

* cited by examiner

*Primary Examiner*—Philip B Tran

(57) ABSTRACT

Various methods are provided for distributing datagrams over telecommunications networks. According to many of these methods, datagrams are multicast or broadcast to one or more nodes or Virtual Local Area Networks (VLANs) on the networks. Also provided are systems for distributing datagrams over the networks according to these methods. According to some of these systems, reductions are provided in the amounts of memory used to multicast and/or broadcast datagrams.

23 Claims, 8 Drawing Sheets

INTERNET PROTOCOL MULTICAST REPLICATION

CROSS REFERENCE TO RELATED APPLICATIONS

This specification claims priority from U.S. Provisional Patent Application Ser. No. 60/483,027, entitled "IPMC Replication," and filed on Jun. 27, 2003 and U.S. Provisional patent Application Ser. No. 60/529,620, entitled "Internet Protocol Multicast Replication," and filed on Dec. 16, 2003. The contents of the Provisional Patent Applications are hereby incorporated herein by reference.

BACKGROUND OF THE INVENTION

1. Field of the Invention

Certain embodiments of the present invention are related to methods for distributing datagrams across a network to a number of different destinations. Certain other embodiments of the present invention are related to systems that can provide for implementation of the above-discussed methods.

2. Description of the Related Art

Datagrams such as, but not limited to, packets, cells, and bit strings, are often replicated and distributed across a communications network in a broadcast or multicast format, thereby reaching a plurality of destinations in the network. In a representative broadcast or multicast, multiple network nodes, virtual local access networks (VLANs), etc., may receive replications of the datagram. One related-art system for distributing a datagram to a plurality of VLANs is illustrated in FIG. 1.

According to the related-art system illustrated in FIG. 1, a datagram 100 that is to be broadcast or multicast enters a first router 105 through a first ingress 110. Once in the first router 105, the datagram 100 illustrated in FIG. 1 is replicated and forwarded to the first egress 115 and second egress 120 of the first router 105. The replicated datagram 100 that is forwarded to the second egress 120 is then transmitted to the third router 125 via the third ingress 130. However, because, in FIG. 1, the third router 125 is not operably connected to any destinations to which the datagram 100 is to be transmitted, the datagram 100 that reaches the third router 125 does not exit through any egress of the third router 125.

The datagram 100 that is transmitted through the first egress 115 of the first router 105 enters the second router 135 through the second ingress 140 thereof. The second router 135 illustrated has four egress ports 145, 150, 155, 160, and each of these egress ports is operably connected to one or more VLANs (VLAN #1, VLAN #2, VLAN #3). The datagram 100 may be forwarded to any and/or all of these VLANS via, for example, a multicast or broadcast.

As illustrated in FIG. 1, the second router 135 includes a first egress port 145, a second egress port 150, and a third egress port 155 that are each operably connected to VLAN #1. The third egress port 155 and fourth egress port 160 illustrated in FIG. 1 are each operably connected to VLAN #2, and the second egress port 150 and third egress port 155 are each operably connected to VLAN #3.

In some situations, it may be desirable for the datagram 100 to be forwarded exclusively to those egress ports of the second router 135 that are operably connected to VLAN #1. If the second router 135 finds itself in such a situation, the second router 135 may behave as illustrated in FIG. 2A, wherein the datagram 100, after being replicated three times, egresses from the second router 135 through the first port 145, second port 150, and third port 155, that are each operably connected to VLAN #1.

FIG. 2B illustrates a situation wherein the second router 135 replicates and transmits the datagram 100 through the third port 155 and fourth port 160 in order to allow the datagram 100 to be forwarded to VLAN #2. In FIG. 2B, the datagram 100 is only replicated twice and is sent through the third egress port 155 and fourth egress port 160.

FIG. 2C illustrates a situation wherein the second router 135 replicates and transmits a datagram 100 to each of the ports that are operably connected to VLAN #1 and VLAN #2. As shown in FIG. 2C, in order to perform this task, the datagram 100 is replicated five times by the second router 135. Then, one replicated datagram is forwarded to each of the first, second, and third ports, 145, 150, 160, respectively. However, because the third port 155 is operably connected to both VLAN #1 and VLAN #2, two replicated datagrams 100 are forwarded to the third port 155 and transmitted therefrom.

It should be noted that the replicated and forwarded datagrams 100 discussed throughout this document may be either routed or bridged. An example of the related-art mechanics involved with replicating and forwarding a routed or bridged datagram 100 to the various egresses discussed above is explained in more detail with reference to FIG. 3.

FIG. 3 illustrates yet another embodiment of a datagram 100 that enters the second router 135 illustrated in FIG. 1 through the second ingress port 140. As illustrated in FIG. 3, once the datagram 100 has entered the second router 135, it proceeds into the Address Resolution Logic ARL) 300 of the router 135. The ARL 300 shown includes an Internet Protocol Multicast (IPMC) controller 305 through which the datagram 100 also proceeds. According to the related art, the IPMC controller 305 replicates the datagram 100 and forwards the replicated datagram 100 to memory units 310, 315, 320, 325 that are each associated with and operably connected to one of the ports/egresses 145, 150, 155, 160, respectively.

According to the related art router 135, each of the memory units 310, 315, 320, 325 include an IPMC table 330 that is referenced by the IPMC controller 305. The IPMC table 330 in a particular memory unit, in turn, references a Most Significant Bit (MSB) table 335 and a Least Significant Bitmap (LSB) table 340 that are each also included in that particular memory unit.

The MSB table 335 and LSB table 340 in each related-art memory unit shown in FIG. 3 are used to determine whether the datagram 100 is to be forwarded through the port or egress to which the memory unit in question is associated with. The related-art MSB table 335 and LSB table 340 discussed above are also used and to determine whether multiple replications of the datagram 100 are to be transmitted via the egress associated with the memory unit in question.

The related art router 135 illustrated in FIG. 3 suffers from several shortcomings. For example, because separate memory units 310, 315, 320, 325 are associated with each of the router's egress ports, and because each of these memory units separately determines both whether the particular egress that it is operably connected to is to transmit a replicated copy of the datagram 100 and how may replications are to be transmitted from that particular egress, a large amount of memory is typically required in the related-art router 135.

Another shortcoming of the related-art router 135 have to do with the fact that, when a set of datagrams enters the router 135 in succession through the ingress port 140, the IPMC controller 305 queues up incoming datagrams and, when appropriate, each datagram is transmitted by the router 135 according to the sequence in which the datagram arrived.

Such a procedure becomes particularly undesirable when some of the queued up datagrams 100 are particularly large and therefore require a substantial amount of processing by the router 135, at least relative to smaller datagrams 100. In such situations, the amount of time that has to be devoted to processing the larger datagrams 100 may slow down the overall operation of the router 135 and/or may lead to loss/dumping of certain datagrams 100 if they cannot be stored in or processed quickly enough through the router 135.

Another disadvantage of the router 135 according to the related art has to do with the fact that the router 135 cannot prioritize datagrams. For example, if a datagram 100 from a high-priority class of service (COS) reaches an ingress 140 of the related-art router 135 illustrated in FIG. 1, this "high-priority" datagram may be forced to wait in a queue until lower-priority datagrams from other COSs, which were received first, are processed. In others words, one shortcoming of data distribution devices according to the related art is that all datagrams that these datagrams receive have to wait their turn, regardless of their level of priority.

In addition to the above, the fact that the related art router 135 illustrated in FIG. 3 includes separate tables or sets of instructions at every egress to determine whether a datagram is to be replicated and/or transmitted across a port that is operably connected to that egress is inefficient. It would be preferable to have fewer tables to reference and store in memory.

At least in view of the above, it is an object of certain embodiments of the present invention to provide methods and systems that allow for fewer tables or sets of instructions to be used in order to multicast or broadcast a datagram across a set of ports or egresses. It is also an object of certain embodiments of the present invention to provide methods and systems that reduce the amount of total memory that is used when multicasting or broadcasting a datagram. Even further, it is an object of certain embodiments of the present invention to provide methods and systems that allow for prioritizing of the replication and/or transmission of datagrams entering a data distribution device through an ingress.

SUMMARY OF THE INVENTION

According to certain embodiments of the present invention, a first method of distributing a datagram over a network is provided. This first method typically includes the step of receiving a datagram through an ingress of a datagram distribution device. The first method also generally includes the step of using memory at the ingress to determine through which device egresses the datagram will be transmitted. The first method further usually includes the step of transmitting replications of the datagram through appropriate egresses.

According to certain other embodiments of the present invention, a second method of distributing a datagram over a network is provided. The second method commonly includes the step of receiving a set of datagram through an ingress of a datagram distribution device. The second method also typically includes the step of prioritizing each datagram in the set of datagrams. The second method further generally includes the step of replicating datagrams based upon priority. Even further, the second method usually includes transmitting replications of datagrams through appropriate egresses of the device.

According to yet other embodiments of the present invention, a third method of distributing a datagram over a network is provided. The third method often includes the step of receiving a datagram through an ingress of a datagram distribution device. The third method also commonly includes the step of referencing a first set of instructions to determine how many times to replicate the datagram. In addition, the third method also generally includes the step of transmitting replications of the datagram through appropriate egresses of the device.

In addition, according certain embodiments of the present invention, a system for distributing a datagram over a network is provided. The system typically includes an ingress through which a datagram may enter the system. The system also normally includes a memory unit that is operably connected to the ingress. According to certain embodiments, the memory unit of the system determines how many times the datagram is replicated. According to other embodiments, the memory unit determines to which of a plurality of egresses replications of the datagram are forwarded. The system also generally includes the plurality of egresses, operably connected to the memory unit.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

In order to provide enhanced datagram distribution capabilities over a network, certain embodiments of the present invention include methods, systems, and/or devices that alleviate some or all of the disadvantages of the related art. One representative system, according to certain embodiments of the present invention, takes the form of the data distribution device 400 illustrated in FIG. 4.

It should be noted that, in the description of the various embodiments of the present invention described herein, broadcasting and multicasting are considered to be methods of distributing datagrams. Hence, references herein to multicasting and/or broadcasting of datagrams generally also apply to distributing datagrams.

Figure 1:
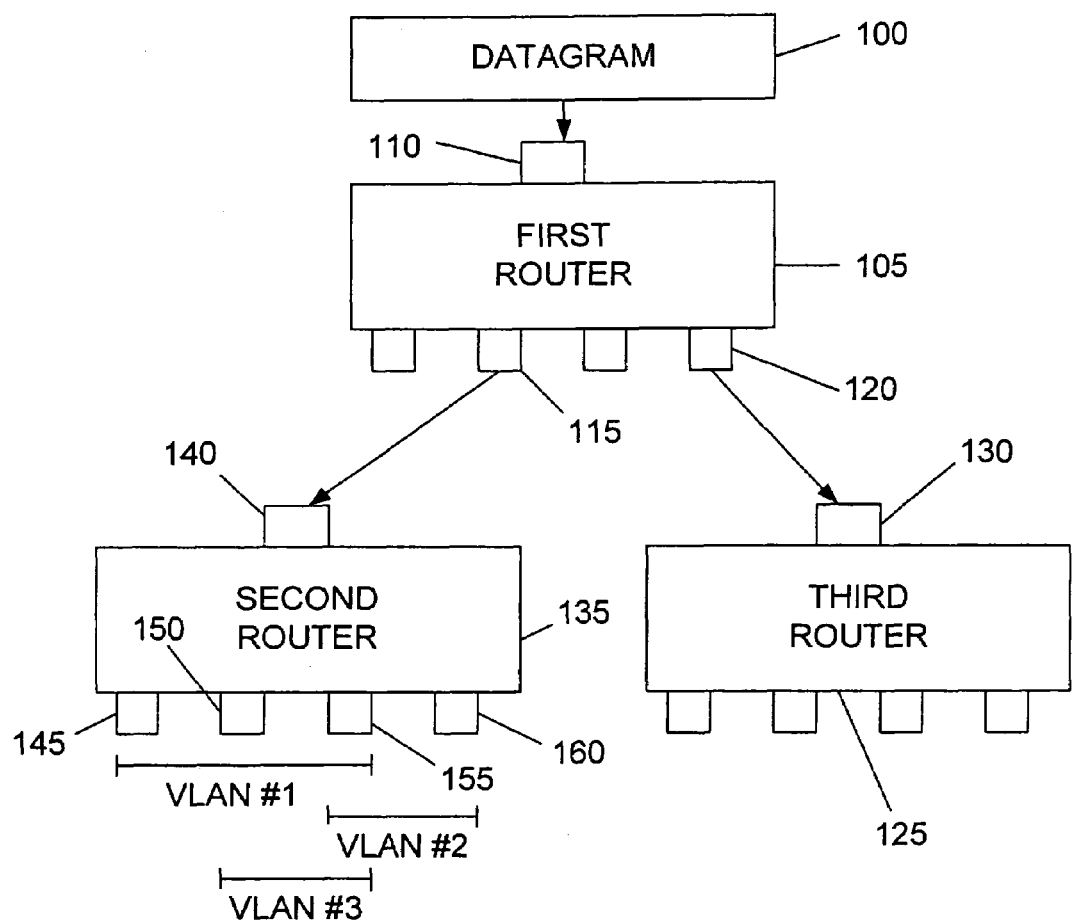
FIG. 1 illustrates a system according to the related art for multicasting a datagram.
Figure 2A:
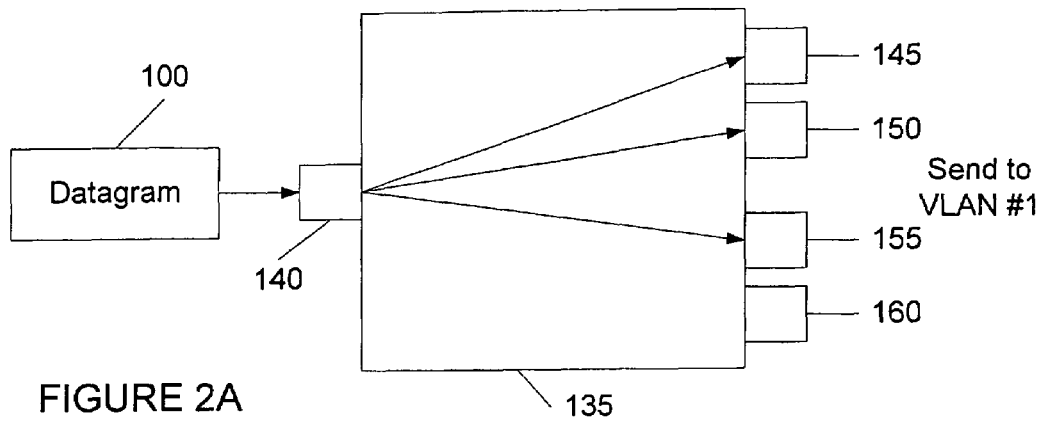
FIGS. 2A-2C illustrate schematically how a router according to the related art may multicast a datagram to a first virtual local area network (VLAN), a second VLAN, and a second and first VLAN simultaneously, respectively.
Figure 2B:
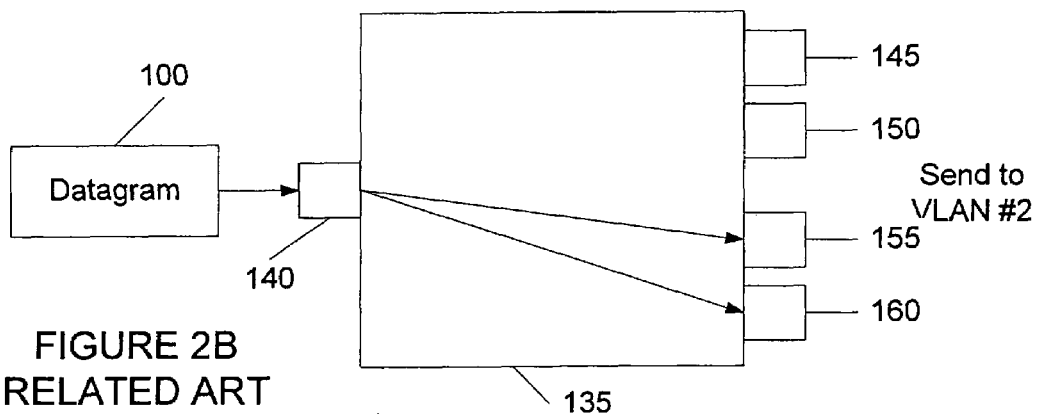
Figure 2C:
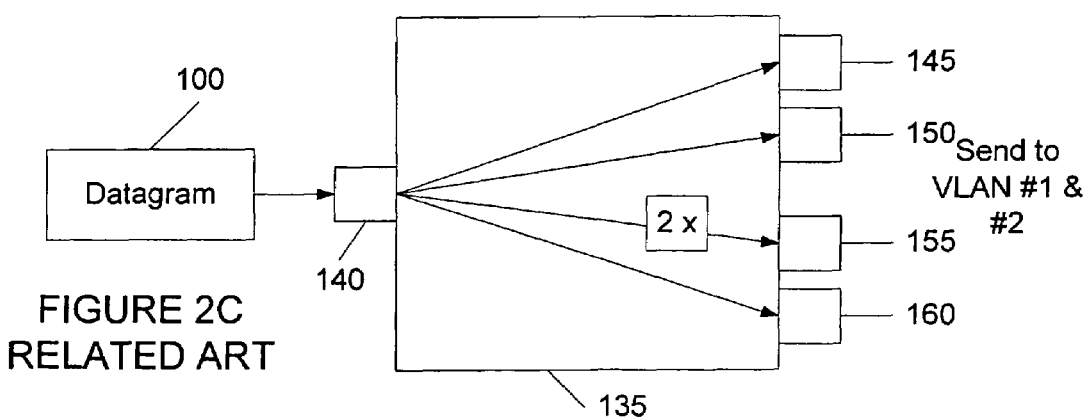
Figure 3:
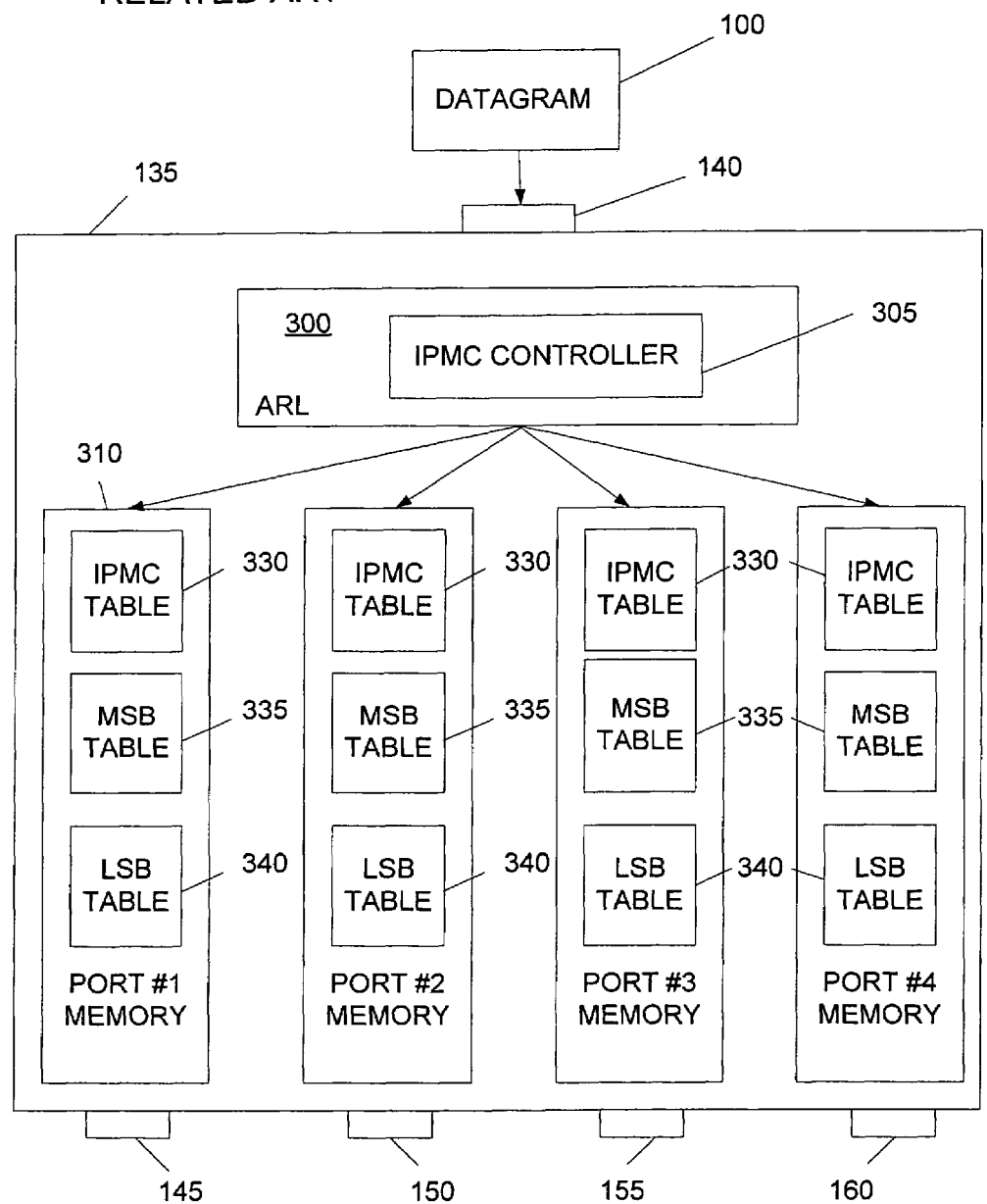
FIG. 3 illustrates a router according to the related art wherein separate memory units are operably connected to each egress of the router for replicating and transmitting a datagram.
Figure 4:
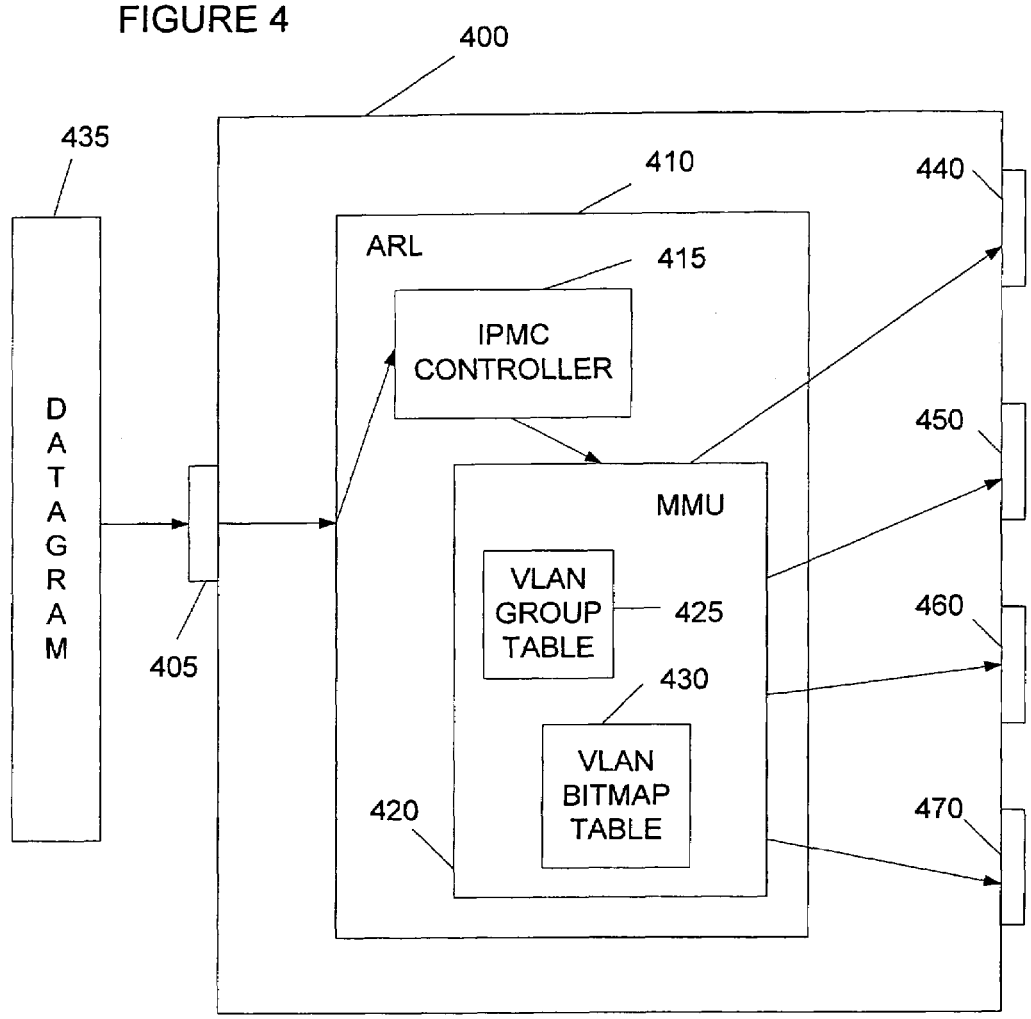
FIG. 4 illustrates a data distribution device according to certain embodiments of the present invention wherein a single memory unit that is operably connected to an ingress is used for replication and transmission of a datagram.

The data distribution device 400 illustrated in FIG. 4 includes an ingress 405 that is operably connected to a logic unit 410. The logic unit 410 typically includes a multicast controlling unit 415 that is also operably connected to the ingress 405. Further, the logic unit 410 includes a memory unit 420 that is preferably at least operably connected to the multicast control unit 415 and, therethrough, the ingress 405.

In the memory unit 420 is included a first set of instructions 425 and a second set of instructions 430.

According to certain embodiments of the present invention, the logic unit 410 takes the form of an Address Resolution Logic (ARL) unit and the multicast controller unit 415 takes the form of an Internet Protocol Multicast (IPMC) controller. According to certain other embodiments of the present invention, the memory unit 420 takes the form of a Memory Management Unit (MU) and the sets of instructions 425, 430 take the form of a Virtual Local Area Network (VLAN) group table and a VLAN bit map table, respectively. The distribution device 400 may include, for example, a router or a switch.

As illustrated in FIG. 4, the egresses 440, 450, 460, 470 are typically operably connected to the memory unit 420. As a result, these egresses 440, 450, 460, 470 are also commonly operably connected to the multicast controller unit 415, the logic unit 410, and the ingress 405.

In operation, the device 400 illustrated in FIG. 4 typically allows a datagram 435 to enter the system or device 400 through the ingress 405. The datagram 405 typically travels into the logic unit 410 through the multicast controller unit 415 and into the memory unit 420. Once the datagram 435 enters the memory unit 420, the memory unit 420 usually determines how many times the datagram is to be replicated and to which of a plurality of egresses the replications of the datagram are to be forwarded. However, according to certain embodiments of the present invention, one or both of these determinations may be made outside of the memory unit 420.

According to certain embodiments of the present invention, the multicast controller unit 415 is operably connected between the ingress 405 and the memory unit 420. However, the multicast controller unit 415 does not necessarily reside in the logic unit 410 in all embodiments of the present invention.

As will be explained in further detail below, the first set of instructions 425 included in the memory unit 420 is typically used to identify an egress through which one or more of the replications of the datagram 435 are to be forwarded. According to certain embodiments of the present invention, the second set of instructions 430 included in the memory unit 420 assists in making the determination of how many times the datagram 435 is to be replicated.

Figure 5:
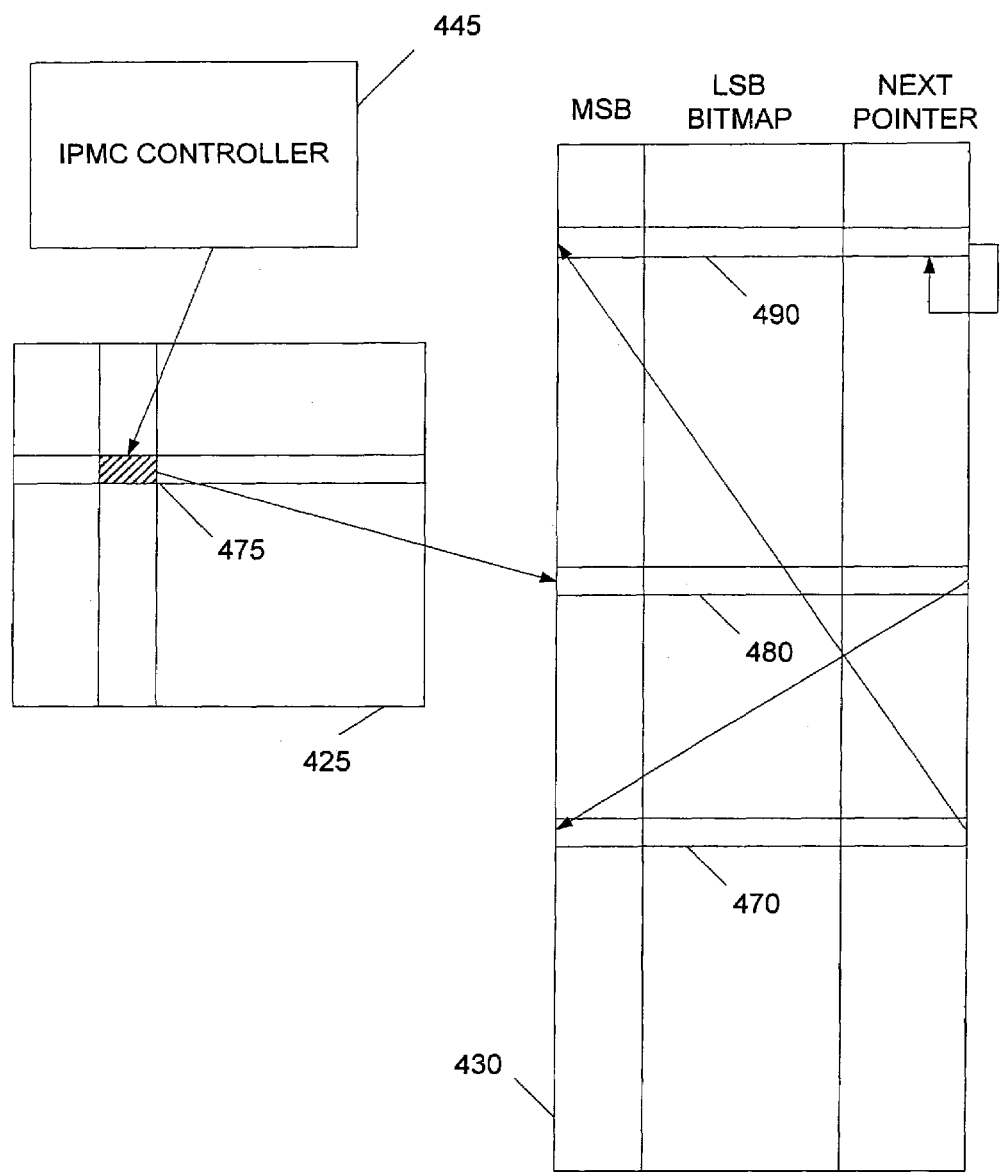
FIG. 5 illustrates an IPMC controller, an VLAN group table, and a VLAN bitmap table according to certain embodiments of the present invention.

FIG. 5 illustrates, in more detail, a representative first set of instructions 425 and a representative second set of instructions 430 according to certain embodiments of the present invention. FIG. 5 also illustrates how the IPMC controller or, more generally, the multicast controller unit 415 discussed above is used to replicate and/or transmit datagrams.

According to FIG. 5, once a datagram enters an ingress of a data distribution device, certain attributes of the datagram are used to allow the multicast controlling unit 415 to select a first instruction from the first set of instructions 425. This first instruction 475, which is shown as a selected VLAN pointer in FIG. 5, is then used to select an initial subset of instructions 480 from the second set of instructions 430, illustrated in FIG. 5 as a VLAN bitmap.

According to certain embodiments of the present invention, the datagram attribute that is used when selecting the VLAN pointer or first instruction 475 in the first set of instructions 425 is the Most Significant Bit (MSB) of the datagram. Once the first instruction 475 is selected from the first set of instructions 425, an initial subset of instructions 480 in the second set of instructions 430 is selected. Generally, a second datagram attribute is used when selecting the initial subset of instructions 480 from the second set of instructions 430. According to certain embodiments, this datagram attribute is the Least Significant Bitmap (LSB) and, as shown in FIG. 5, leads to the selection of the initial subset of instructions 480.

An LSB such as, for example, the LSB included in initial instruction 480, typically includes a group of bits, each of which normally has an integer value such as "0", "1", or higher. Commonly, assigning an LSB bit a value of "1" indicates that one VLAN is selected and that one replication should be sent to that VLAN. Hence, the values of all of the bits in the LSB may be added up to determine how many times a datagram should be replicated in order to allow for the transmission of an appropriate number of datagrams to an egress port.

The information contained in the initial subset of instructions 480 may vary widely. However, according to certain embodiments of the present invention, the initial subset of instructions 480 contains information about which egress of the data distribution device should be used to transmit a first packet or datagram. When the MSB and the LSB included in the initial subset of instructions 480 are taken together, this combination identifies a particular VLAN to which a first replicated and/or transmitted datagram is to be forwarded.

Another piece of information that is included typically in the initial subset of instructions 480 in the second set of instructions 430 is an instruction for referencing another subset of for instructions, for example, a row, in the second set of instructions 430, for example, a VLAN bitmap table. As shown in FIG. 5, data in the "Next Pointer" column specifies that the intermediate subset of instructions 485 illustrated in FIG. 5 be used.

As also shown in FIG. 5, data in the "Next Pointer" column references a final subset of instructions 490. The final subset of instructions 490 includes a "Next Pointer" that references back to the final subset of instructions. According to certain embodiments of the present invention, this self-referencing by a subset of instructions in the second set of instructions 430 is the preferred method for indicating that no further datagrams should be replicated and/or transmitted.

Also referencing FIG. 5, according to certain embodiments, an IPMC controller 415 may analyze a datagram that passes through an ingress of a data distribution device. According to certain embodiments, the egress port of the datagram is used to select a first instruction 475, which may take the form of a selected VLAN Table pointer from the first set of instructions 425. Then, this selected VLAN Table pointer, in the form of first instruction 475, may be used to select an initial subset of instructions 480 from a second set of instructions 430. This first or initial subset of instructions 480 may contain a pointer that points back to the same subset of instructions 480 or may contain a pointer that points to another subset of instructions. If the pointer points back to the initial subset of instructions 480, a number of replications of this datagram may be forwarded to a single egress and transmitted therefrom. This value may correspond to a value based upon adding the values of all of the bits in the Least Significant Bitmap (LSB) in, for example, intermediate subset of instructions 485.

If, however, the pointer in the initial subset of instructions 480 points to an intermediate subset of instructions 485, a datagram is typically forwarded and transmitted from an egress specified in that intermediate subset of instructions 485. Generally, this process continues, potentially including a multitude of intermediate subsets of instructions, until a final subset of instructions 490 is reached wherein the pointer in this final subset 490 points back to the final subset 490.

Figure 6:
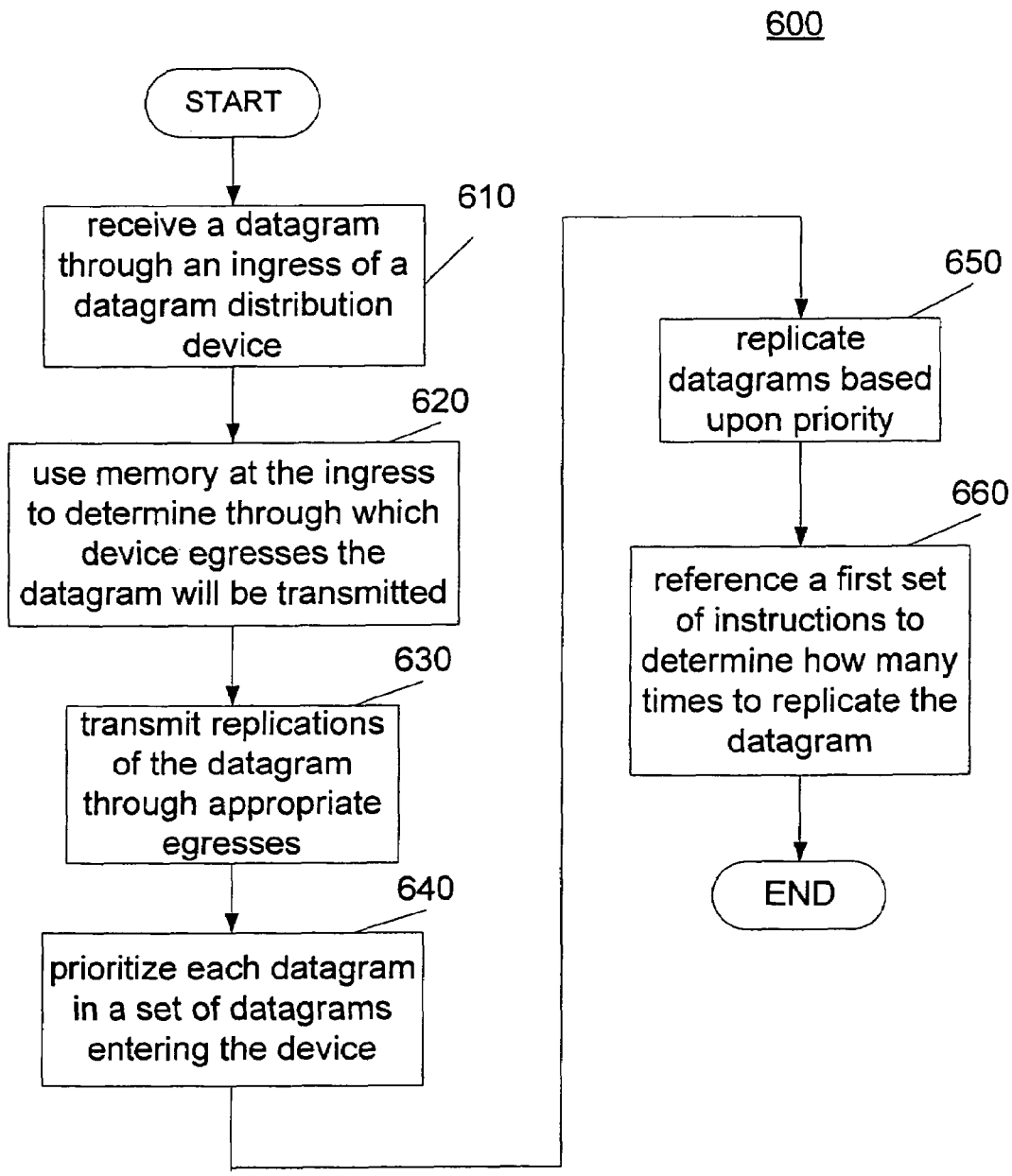
FIGS. 6-8 contain various algorithms illustrating the steps of methods according certain embodiments of the present invention.

FIG. 6 illustrates a first algorithm 600 that includes a series of steps that may be used, according to certain embodiments of the present invention, to distribute a datagram over a network. The first step 610 illustrated in FIG. 6 specifies receiving the datagram through an ingress of a datagram distribution device. According to certain embodiments of the present invention, the datagram may be in the form of a packet, the ingress may be in the form of a port, and the datagram distribution device may be in the form of a router or switch. The second step 620 illustrated in FIG. 6 specifies using memory at the ingress to determine through which device egresses the datagram will be transmitted. According to certain embodiments of the present invention, the memory recited in the second step may take the form of the memory unit 420 illustrated in FIG. 4.

According to certain other embodiments of the present invention, the memory recited in the second step 620 may be positioned further from the ingress 405 than is shown in FIG. 4. For example, intermediate components may be included between the ingress 405 and the memory unit 420. However, the memory unit 420 is generally at least operably connected to the ingress 405, as opposed to being more closely associated with any of the egresses of the data distribution device.

The third step 630 illustrated in FIG. 6 specifies transmitting replications of the datagram through appropriate egresses. Then, according to the fourth step 640 illustrated in FIG. 6, each datagram in a set of datagrams that enters the device over time is prioritized relative to the other datagrams. Priority of each datagram may be established based on, for example, size or class of service (COS) of the respective datagrams.

The fifth step 650 of the first algorithm 600 specifies replicating datagrams based upon the priority discussed with reference to the fourth step 640. Then, according to the sixth step 660, a first set of instructions may be referenced to determine how many times to replicate the datagram.

Figure 7:
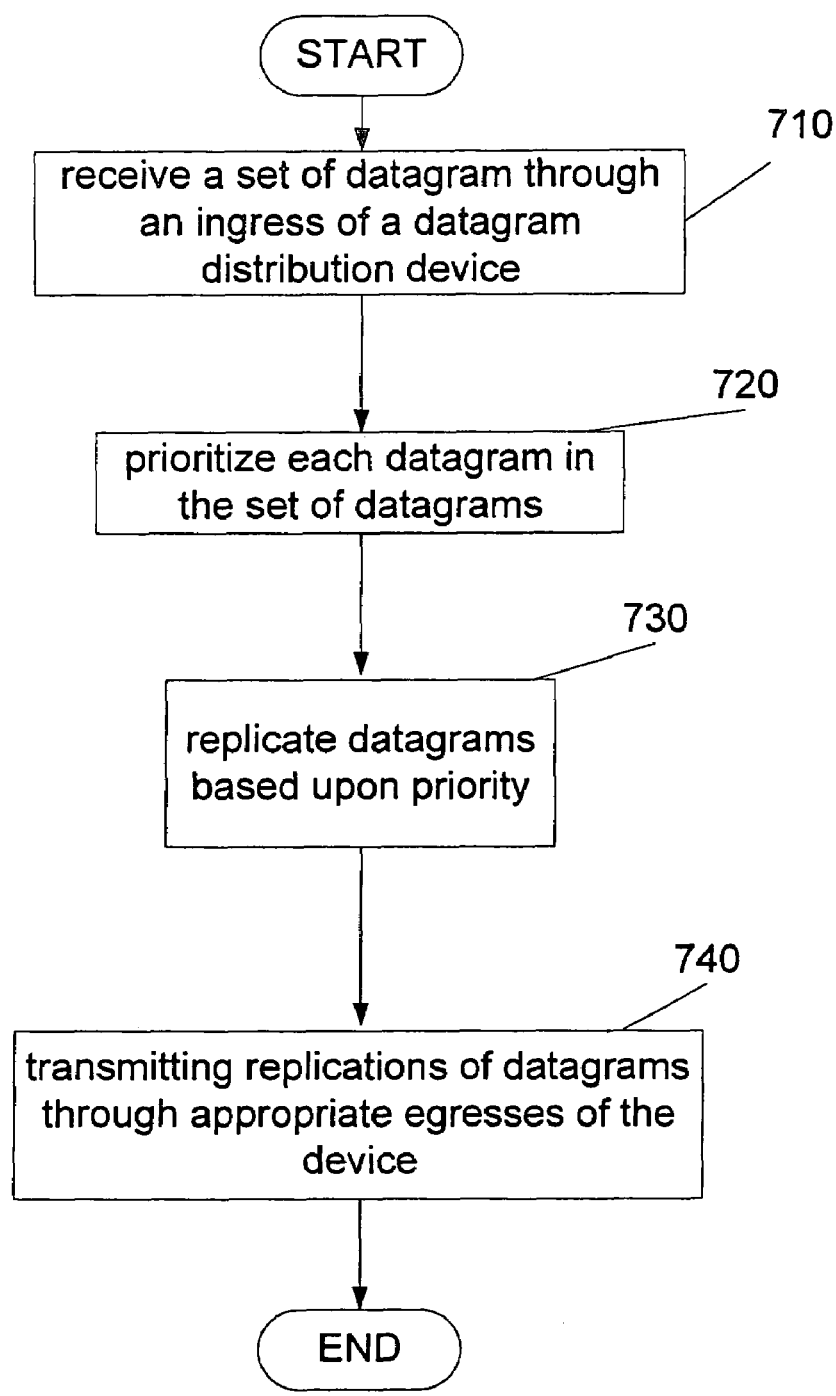

FIG. 7 illustrates a second algorithm 700 that may be used for distributing a datagram over a network. According to the first step 710 illustrated in FIG. 7, a set of datagrams is received through an ingress of a datagram distribution device. Then, each datagram in the set of datagrams received is prioritized according to second step 720. According to certain embodiments of the present invention, a datagram's COS may be used to determine the datagram's level of priority.

The third step 730 illustrated in FIG. 7 specifies replicating datagrams based upon priority. However, datagrams may also be replicated based upon other attributes. According to certain embodiments of the present invention, higher-priority datagrams are replicated before lower-priority datagrams. According to certain other embodiments, concurrent or simultaneous replication may occur of at least two datagrams in the set of datagrams.

Although datagrams typically enter the data distribution device sequentially through a single ingress, a datagram that enters the device first may take longer to replicate fully. Hence, according to certain embodiments, the data distribution device or system is configured so as to be able to replicate both datagrams simultaneously or concurrently.

According to embodiments with concurrent replication, the replication of higher-priority and lower-priority datagrams is inter-leaved, particularly if a round-robin method of datagram distribution is used. According to such embodiments, one datagram may not have a sufficiently high priority to stop the replication of another datagram that arrived previously. However, in such circumstances, one replication of the first, lower-priority datagram may be carried out, followed by one replication of the second, higher-priority datagram, and so on, effectively inter-leaving the replication of the two datagrams.

According to the fourth step 740 illustrated in FIG. 7, replications of the datagrams are transmitted through appropriate egresses of the data distribution device.

Figure 8:
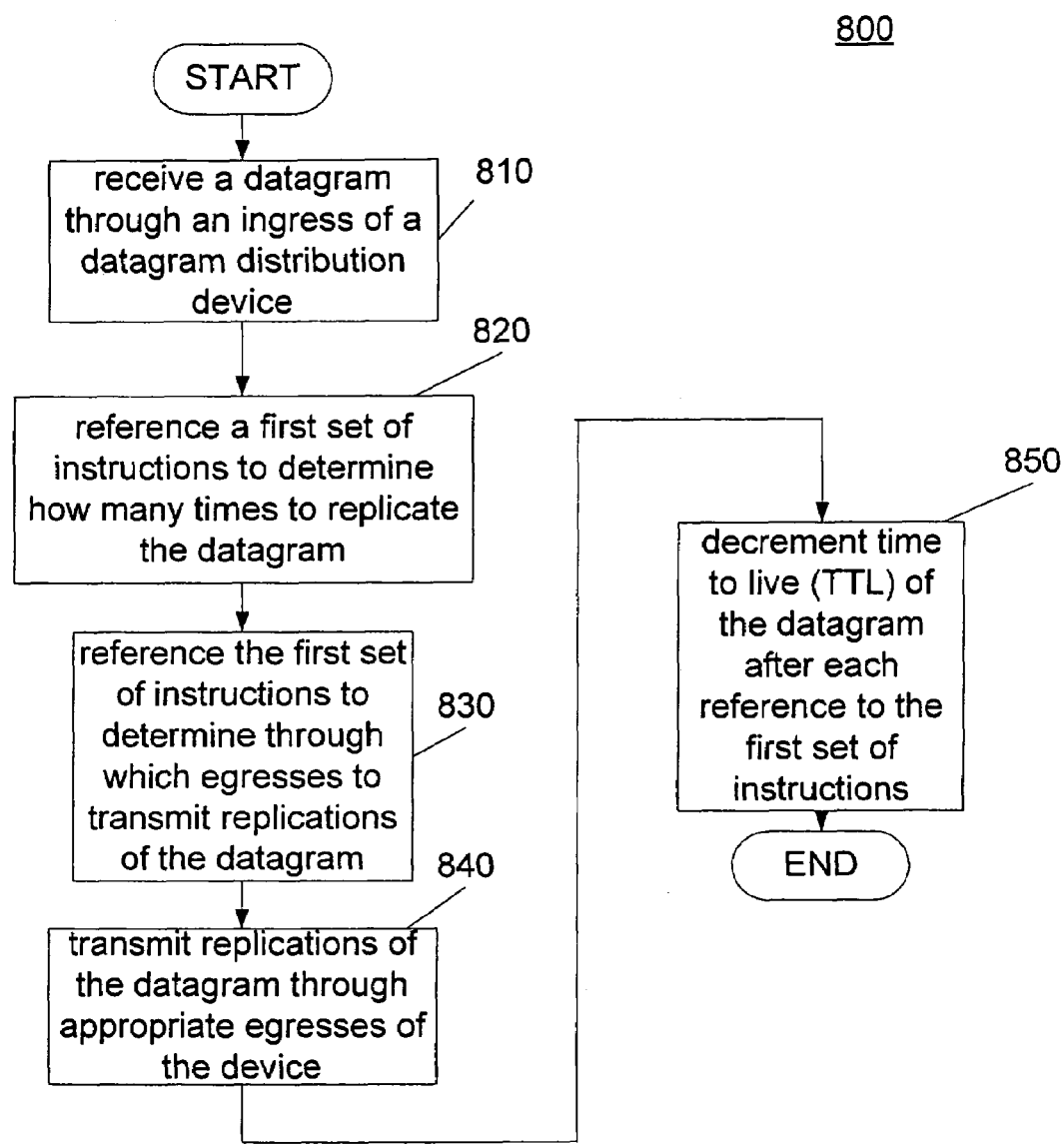

FIG. 8 illustrates a third algorithm 800 that may be used for distributing a datagram over a network. According to the first step 810, a datagram is received through an ingress of a datagram distribution device. Then, according to the second step 820, a first set of instructions is commonly referenced to determine how many times to replicate the datagram. This first set of instructions may take the form of a VLAN group table.

According to certain embodiments of the present invention, an LSB may be used from the datagram to determine how may times to replicate the datagram. Also, an LSB and an MSB from the datagram may be used to select a VLAN to which to transmit a replication of the datagram. Further, the first set of instructions may be repeatedly referenced before transmitting any of the replications.

The third step 830 illustrated in FIG. 8 specifies referencing the first set of instructions to determine through which egresses to transmit replications of the datagram. According to certain embodiments of the present invention, an MSB from the datagram may be used to choose the egresses.

The fourth step 840 specifies transmitting replications of the datagram through appropriate egresses of the device. The appropriate egresses may be selected based upon, for example, which virtual local area networks (VLANs) each egress is operably connected to. Then, according to the fifth step 850 illustrated in FIG. 8, the time to live (TTL) of the datagram may be decremented after each reference to the first step of instructions.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of distributing a datagram over a network, the method comprising:

receiving a datagram through an ingress of a datagram distribution device; referencing, based on a first attribute of the datagram, a first instruction from a first set of instructions from a memory unit to select an initial subset of instructions from a second set of instructions included in the memory unit;

selecting the initial subset of instructions from the second set of instructions based on the first instruction and a second attribute of the datagram, the initial subset of instructions indicating an egress through which the datagram should be sent and a reference to another subset of instructions;

if the reference to the another subset of instructions refers to a subset of instructions other than the subset which included the reference, selecting another subset of instructions based on the reference included in the initial subset, the another subset of instructions indicating another egress through which the datagram should be sent and a reference to another subset of instructions, and continuing to select another subset of instructions based on the reference until the reference refers back to the same subset which includes the reference; and transmitting replications of the datagram through the indicated egresses based on the selected subsets of instructions.

2. The method of claim 1, further comprising:
prioritizing at least two datagrams in the set of datagrams; and
replicating at least two datagrams based upon the priority.

3. The method of claim 2, wherein the prioritizing comprises prioritizing each datagram in the set of datagrams, and wherein the datagrams are replicated based on the priority.

4. The method of claim 1, wherein the first attribute of the datagram includes a Most Significant Bit (MSB).

5. The method of claim 1, wherein the second attribute of the datagram includes a Least Significant Bitmap (LSB).

6. A method of distributing a datagram over a network, the method comprising:
receiving at least a higher-priority datagram and a lower-priority datagram through an ingress of a datagram distribution device, the priorities of the datagrams being based on their respective classes of service;
replicating the higher-priority datagram before replicating the lower-priority datagram based upon their respective priorities;
for each of the datagrams:
referencing, based on a first attribute of the datagram, a first instruction from a first set of instructions from a memory unit to select an initial subset of instructions from a second set of instructions included in the memory unit;
selecting the initial subset of instructions from the second set of instructions based on the first instruction and a second attribute of the datagram, the initial subset of instructions indicating an egress through which the datagram should be sent and a reference to another subset of instructions;
if the reference to the another subset of instructions refers to a subset of instructions other than the subset which included the reference, selecting another subset of instructions based on the reference included in the initial subset, the another subset of instructions indicating another egress through which the datagram should be sent and a reference to another subset of instructions, and continuing to select another subset of instructions based on the reference until the reference refers back to the same subset which includes the reference; and
transmitting replications of the datagrams through the indicated egresses of the device based on the selected subsets of instructions.

7. The method of claim 6, wherein:
the receiving includes receiving the higher-priority datagram and the lower-priority datagram and at least a third datagram; and
the replicating comprises replicating the third datagram simultaneously with either the higher-priority datagram or the lower-priority datagram.

8. The method of claim 6, wherein the replicating comprises interleaving replication of higher-priority and lower-priority datagrams.

9. A method of distributing a datagram over a network, the method comprising:
receiving a datagram through an ingress of a datagram distribution device; referencing, based on a first attribute of the datagram, a first instruction from a first set of instructions from a memory unit to select an initial subset of instructions from a second set of instructions included in the memory unit to determine how many times to replicate the datagram;
selecting the initial subset of instructions from the second set of instructions based on the first instruction and a second attribute of the datagram, the initial subset of instructions indicating an egress through which the datagram should be sent and a reference to another subset of instructions;
if the reference to the another subset of instructions refers to a subset of instructions other than the subset which included the reference, selecting another subset of instructions based on the reference included in the initial subset, the another subset of instructions indicating another egress through which the datagram should be sent and a reference to another subset of instructions, and continuing to select another subset of instructions based on the reference until the reference refers back to the same subset which includes the reference; and
transmitting replications of the datagram through the indicated egresses of the device.

10. The method of claim 9, wherein the referencing comprises using a least significant bit (LSB) from the second set of instructions to determine how many times to replicate the datagram.

11. The method of claim 9, further comprising:
using a least significant bitmap (LSB) from the second set of instructions to select the egresses.

12. The method of claim 9, wherein the transmitting comprises selecting the appropriate egresses based upon which virtual local area networks (VLANs) each egress is operably connected.

13. The method of claim 9, wherein the referencing comprises using an LSB and an MSB from the datagram to select a VLAN to which to transmit a replication of the datagram.

14. The method of claim 9, wherein the referencing comprises repeatedly referencing the first set of instructions before transmitting the replications.

15. The method of claim 14, further comprising:
decrementing time to live (TTL) of the datagram after each reference to the first set of instructions.

16. A system for distributing a datagram over a network, the system comprising:
an ingress configured to receive a datagram;
a memory unit, operably connected to the ingress; and
a plurality of egresses, operably connected to the memory unit;
wherein the memory unit is configured to:
reference, based on a first attribute of the datagram, a first instruction from a first set of instructions from the memory unit to select an initial subset of instructions from a second set of instructions included in the memory unit;
select the initial subset of instructions from the second set of instructions based on the first instruction and a second attribute of the datagram, the initial subset of instructions indicating an egress through which the datagram should be sent and a reference to another subset of instructions;
if the reference to the another subset of instructions refers to a subset of instructions other than the subset which included the reference, select another subset of instructions based on the reference included in the initial subset, the another subset of instructions indicating another egress through which the datagram should be sent and a reference to another subset of instructions, and continue to select another subset of instructions based on the reference until the reference refers back to the same subset which includes the reference; and transmit replications of the datagram through the indicated egresses based on the selected subsets of instructions.

17. The system of claim 16, further comprising:
a multicast controller, operably connected between the ingress and the single memory unit.

18. The system of claim 16, wherein the datagram comprises at least one of a routed datagram and a bridged datagram.

19. The system of claim 16, wherein the first attribute of the datagram includes a Most Significant Bit (MSB).

20. The system of claim 16, wherein the second attribute of the datagram includes a Least Significant Bitmap (LSB).

21. A system for distributing a datagram over a network, the system comprising:
an ingress means for allowing a datagram to enter the system;
a memory means, operably connected to the ingress means, for determining how many times the datagram is replicated; and
a plurality of egress means, operably connected to the memory means, for transmitting the datagram out of the system;
wherein the memory means is configured to:
reference, based on a first attribute of the datagram, a first instruction from a first set of instructions from the memory means to select an initial subset of instructions from a second set of instructions included in the memory means;
select the initial subset of instructions from the second set of instructions based on the first instruction and a second attribute of the datagram, the initial subset of instructions indicating at least one of the egress means through which the datagram should be sent and a reference to another subset of instructions;
if the reference to the another subset of instructions refers to a subset of instructions other than the subset which included the reference, select another subset of instructions based on the reference included in the initial subset, the another subset of instructions indicating at least one egress means through which the datagram should be sent and a reference to another subset of instructions, and continue to select another subset of instructions based on the reference until the reference refers back to the same subset which includes the reference; and
transmit replications of the datagram through the indicated egress means based on the selected subsets of instructions.

22. The system of claim 21, wherein the first attribute of the datagram includes a Most Significant Bit (MSB).

23. The system of claim 21, wherein the second attribute of the datagram includes a Least Significant Bitmap (LSB).

* * * * *